United States Patent Office 2,897,226
Patented July 28, 1959

2,897,226

O-(2,6-DICYCLOHEXYL-4-LOWER-ALKYLPHENYL) O,O-DIMETHYL PHOSPHOROTHIOATES

Edgar C. Britton and Henry Tolkmith, Midland, Mich., assignors to The Dow Chemical Company, Midland, Mich., a corporation of Delaware No Drawing. Application April 4, 1956
Serial No. 575,958

4 Claims. (Cl. 260—461)

This invention is directed to the O-(2,6-dicyclohexyl-4-lower-alkylphenyl) O,O-dimethyl phosphorothioates having the formula

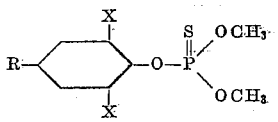

In this and succeeding formulas, X represents a cyclohexyl radical and R represents a lower-alkyl radical, i.e., an alkyl radical containing from 1 to 4 carbon atoms, inclusive. These new compounds are viscous liquids, somewhat soluble in organic solvents and of very low solubility in water. They have been found to be active as parasiticides and are adapted to be employed as active toxic constituents of compositions for the control of bacteria, mites and insect organisms such as the Mexican bean beetle.

The new compounds may be prepared by the reaction of an O,O-dimethyl phosphorochloridothioate,

with a potassium or sodium 2,6-dicyclohexyl-4-lower-alkylphenolate having the formula

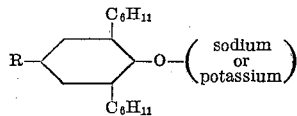

The reaction is carried out in the presence of an inert organic solvent such as toluene or benzene, and in the presence of a tertiary amine such as pyridine. The tertiary amine catalyzes the reaction between the phosphorochloridothioate and alkali metal phenolate reagent. In the absence of the tertiary amine the reaction proceeds slowly. Good results are obtained when employing substantially equimolecular proportions of the phenolate and phosphorochloridothioate reagent and an amount of catalyst of 0.1 mole or more per mole of the phosphorochloridothioate reagent. The reaction takes place smoothly at the temperature range of from 30° to 80° C. with the formation of the desired product. Upon completion of the reaction, the desired product is separated in conventional fashion.

In carrying out the reaction, the alkali metal 2,6-dicyclohexyl-4-lower-alkylphenolate, preferably as the sodium salt, and O,O-dimethyl phosphorochloridothioate are mixed together and the pyridine catalyst added thereto. The resulting mixtures of reagents and catalyst are heated for a period of time at a temperature of from 30° to 80° C. Upon completion of the reaction, the reaction mixture is washed with water and the solvent removed by evaporation or fractional distillation under reduced pressure to obtain the desired product as a liquid residue.

The following examples illustrate the invention but are not to be construed as limiting:

EXAMPLE 1

O-(2,6-dicyclohexyl-4-methylphenyl) O,O-dimethyl phosphorothioate

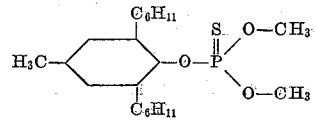

One-half mole (136.2 grams) of 2,6-dicyclohexyl-4-methylphenol was dissolved in two liters of methanol at room temperature and 11.6 grams (0.5 mole) of sodium was added portionwise thereto over a period of 80 minutes. The greater portion of the methanol was then removed by evaporation. To the residue was added 1.2 liters of toluene and the resulting mixture thereafter distilled until the distillate was found to be substantially toluene and the remaining traces of methanol had been removed from the mixture. As a result of these operations, there was obtained a distillation residue containing a suspension of sodium 2,6-dicyclohexyl-4-methylphenolate in toluene.

A solution of 80.3 grams (0.5 mole) of O,O-dimethyl phosphorochloridothioate in 240 milliliters of toluene was added slowly to the above suspension with stirring at 40° C. A solution of 10 milliliters of pyridine in 100 milliliters of benzene was then added to the above suspension of phenolate and phosphorochloridothioate, and the resulting mixture heated for six hours at 50° C. and then for two hours at 60° C. Following the heating period, the reaction mixture was washed with water and the toluene removed from the washed mixture by fractional distillation under reduced pressure. The residue was then dissolved in cyclohexane, and the resulting solution filtered and the cyclohexane thereafter removed from the filtrate by evaporation. As a result of these operations, there was obtained as a residue an O-(2,6-dicyclohexyl-4-methylphenyl) O,O-dimethyl phosphorothioate product as a dark, viscous liquid. This product had a density of 1.0596 at 35° C. and a refractive index n/D of 1.532 at 35° C.

EXAMPLE 2

O-(2,6-dicyclohexyl-4-isophopylphenyl) O,O-dimethyl phosphorothioate

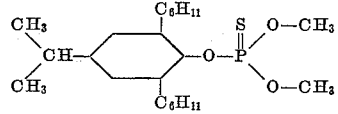

Sodium 2,6-dicyclohexyl-4-isopropylphenolate was prepared by dissolving 60.3 grams (0.2 mole) of 2,6-dicyclohexyl-4-isopropylphenol in 800 milliliters of methanol and adding thereto 4.6 grams (0.2 mole) of sodium portionwise in about one hour. The greater proportion of the methanol was then removed by distillation under reduced pressure and the residue dispersed in 500 milliliters of toluene. The toluene mixture was then distilled until toluene appeared as the only constituent of the distillate to obtain a suspension of the phenolate in toluene.

O,O-dimethyl phosphorochloridothioate (32 grams, 0.2 mole) dissolved in 60 milliliters of toluene was added to the above prepared suspension over a period of 10 minutes. The addition was carried out with stirring and at a temperature of 40° C. After the addition, 10 milliliters of pyridine dissolved in 100 milliliters of benzene was added to catalyze the reaction. The reaction mixture was then heated for 8 hours at 50°–60° C. and thereafter processed as described in Example 1 to obtain an O-(2,6-dicyclohexyl-4-isopropylphenyl) O,O-dimethyl phosphorothioate product as a dark viscous liquid. This product had a density of 1.0728 at 35° C. and a refractive index n/D of 1.5338 at 35° C.

EXAMPLE 3

*O-(2,6-dicyclohexyl-4-secondary-butylphenyl) O,O-dimethyl phosphorothioate*

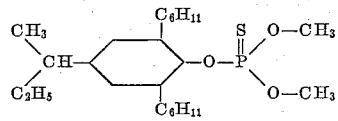

Two-tenths mole (63 grams) of 2,6-dicyclohexyl-4-secondary butylphenol was dissolved in 800 milliliters of methanol and 4.6 grams (0.2 mole) of sodium added portionwise thereto in about one hour. Most of the methanol was then removed by distillation under reduced pressure. The residue was thereafter dispersed in 500 milliliters of toluene and the mixture distilled to separate the remaining traces of methanol. To the distillation residue was added 32 grams (0.2 mole) of O,O-dimethyl phosphorochloridothioate dissolved in 60 milliliters of toluene. The addition was carried out with stirring and at a temperature of 40° C. A solution of 10 milliliters of pyridine in 100 milliliters of benzene was added as catalyst and the reaction mixture heated for 8 hours at 50°–60° C. Following the heating period, the reaction mixture was processed as described in Example 1 to obtain an O-(2,6-dicyclohexyl-4-secondary-butylphenyl) O,O-dimethyl phosphorothioate product as a dark viscous liquid having a density of 1.0749 at 35° C. and a refractive index n/D of 1.5347 at 35° C.

In a similar manner, other O-(2,6-dicyclohexyl-4-loweralkylphenyl) O,O-dimethyl phosphorothioates may be prepared as follows:

O-(2-6-dicyclohexyl-4-ethylphenyl) O,O-dimethyl phosphorothioate by the reaction of sodium 2,6-dicyclohexyl-4-ethylphenolate and O,O-dimethyl phosphorochloridothioate in the presense of pyridine as a catalyst.

O-(2,6-dicyclohexyl-4-normal-propylphenyl) O,O-dimethyl phosphorothioate by the reaction of sodium 2,6-dicyclohexyl-4-normal-propylphenolate and O,O-dimethyl phosphorochloridothioate in the presence of pyridine as a catalyst.

O-(2,6-dicyclohexyl-4-normal-butylphenyl) O,O-dimethyl phosphorothioate by the reaction of sodium 2,6-dicyclohexyl-4-normal-butylphenolate and O,O-dimethyl-phosphorochloridothioate in the presence of pyridine as a catalyst.

The new O-(2,6-dicyclohexyl-4-alkylphenyl) O,O-dimethyl phosphorothioates are effective as parasiticides and are adapted to be employed for the control of household and agricultural pests. For such use the products may be dispersed on a finely divided carrier and employed as dusts. The new products may also be employed in oil, as constituents in water emulsions or in water dispersions. In a representative operation 100 percent controls of two spotted spider mites and Mexican bean beetles have been obtained with aqueous compositions containing three pounds of O-(2,6-dicyclohexyl-4-methylphenyl) O,O-dimethyl-phosphorothioate per 100 gallons of water.

We claim:

1. An O-(2,6-dicyclohexyl-4-lower-alkylphenyl) O,O-dimethyl phosphorothioate having the formula

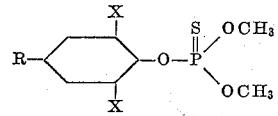

in which R represents a lower alkyl radical and X represents a cyclohexyl radical.

2. O-(2,6-dichyclohexyl-4-methylphenyl) O,O-dimethyl phosphorothioate.

3. O-(2,6-dicyclohexyl - 4 - isopropylphenyl) O,O - dimethyl phosphorothioate.

4. O-(2,6-dicyclohexyl-4-secondary-butylphenyl) O,O-dimethyl phosphorothioate.

References Cited in the file of this patent

UNITED STATES PATENTS

| | | |
|---|---|---|
| 2,506,344 | Cleary | May 2, 1950 |
| 2,657,229 | Orochena | Oct. 27, 1953 |

OTHER REFERENCES

Skraup et al.: "Berichte, Deutsche Chemische Gesellschaft," vol. 60B, pp. 1070–4 (1927).